(12) United States Patent
Yoshikawa et al.

(10) Patent No.: US 7,512,087 B2
(45) Date of Patent: Mar. 31, 2009

(54) COMMUNICATION SYSTEM, APPARATUS AND METHODS EMPLOYING MULTIPLE COMMUNICATION NETWORKS

(75) Inventors: Munehiro Yoshikawa, Kanagawa (JP); Kenichi Sakusabe, Tokyo (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 09/969,916

(22) Filed: Oct. 2, 2001

(65) Prior Publication Data
US 2002/0075876 A1    Jun. 20, 2002

(30) Foreign Application Priority Data
Oct. 4, 2000    (JP)    ............... 2000-304524

(51) Int. Cl.
    *H04W 4/00*    (2006.01)
(52) U.S. Cl. ................. 370/328; 370/338; 370/465; 709/250
(58) Field of Classification Search ................. 370/328, 370/338, 352, 401
    See application file for complete search history.

(56) References Cited

U.S. PATENT DOCUMENTS

| | | | |
|---|---|---|---|
| 5,101,499 A | 3/1992 | Streck et al. |
| 5,410,326 A | 4/1995 | Goldstein |
| 5,410,343 A | 4/1995 | Coddington et al. |
| 5,467,341 A | 11/1995 | Matsukane et al. |
| 5,550,754 A | 8/1996 | McNelley et al. |
| 5,621,456 A | 4/1997 | Florin et al. |
| 5,802,467 A | 9/1998 | Salazar et al. |
| 5,815,665 A | 9/1998 | Teper et al. |

(Continued)

FOREIGN PATENT DOCUMENTS

CN    1235499    11/1999

(Continued)

OTHER PUBLICATIONS

Vazquez-Cortizo D et al: "FS-aloha, a collision resolution algorithm with Qos support for the contention channel in multiservices wireless Lan" Global Telecommunications Conference (Globecom 99), vol. 5, (Dec. 5, 1999), pp. 2773-2777, XP010373453.

(Continued)

*Primary Examiner*—Michael J Moore, Jr.
(74) *Attorney, Agent, or Firm*—Frommer Lawrence & Haug LLP; William S. Frommer; Thomas F. Presson

(57) ABSTRACT

A communication system, method and apparatus which can maintain favorable communication quality without imposing much burden upon a user. A plurality of communication networks are formed between first and second communication apparatus. Upon starting communication between the first and second apparatus, communication quality of the communication networks is measured using at least one of the communication apparatus. One of the communication apparatus is selected for communication based on a result of the measurement. The first and second apparatus may be a base apparatus and a portable terminal apparatus, respectively, for use in the home, in which the base apparatus receives a television broadcast and transmits a selected television program of the broadcast to the terminal apparatus for display thereon. The communication networks may include a radio network and a wireline network. The terminal apparatus may also be adapted to access the Internet via the base apparatus.

24 Claims, 9 Drawing Sheets

U.S. PATENT DOCUMENTS

| | | | |
|---|---|---|---|
| 5,862,339 A | 1/1999 | Bonnaure et al. | |
| 5,887,255 A | 3/1999 | Jackson et al. | |
| 5,896,131 A | 4/1999 | Alexander | |
| 5,898,673 A * | 4/1999 | Riggan et al. | 370/237 |
| 5,917,810 A | 6/1999 | De Bot | |
| 5,920,701 A | 7/1999 | Miller et al. | |
| 5,933,141 A | 8/1999 | Smith | |
| 5,949,432 A | 9/1999 | Gough et al. | |
| 5,999,612 A * | 12/1999 | Dunn et al. | 379/212.01 |
| 6,012,088 A | 1/2000 | Li et al. | |
| 6,021,158 A * | 2/2000 | Schurr et al. | 375/211 |
| 6,028,600 A | 2/2000 | Rosin et al. | |
| 6,037,998 A | 3/2000 | Usui et al. | |
| 6,040,829 A | 3/2000 | Croy et al. | |
| 6,064,653 A * | 5/2000 | Farris | 370/237 |
| 6,097,441 A | 8/2000 | Allport | |
| 6,104,334 A | 8/2000 | Allport | |
| 6,211,858 B1 | 4/2001 | Moon et al. | |
| 6,233,452 B1 | 5/2001 | Nishino | |
| 6,263,503 B1 | 7/2001 | Margulis | |
| 6,317,792 B1 | 11/2001 | Mundy et al. | |
| 6,363,245 B1 | 3/2002 | Natori | |
| 6,393,412 B1 | 5/2002 | Deep | |
| 6,396,523 B1 | 5/2002 | Segal et al. | |
| 6,400,962 B1 | 6/2002 | Yamada | |
| 6,417,869 B1 | 7/2002 | Do | |
| 6,442,532 B1 | 8/2002 | Kawan | |
| 6,466,233 B1 | 10/2002 | Mitani | |
| 6,469,633 B1 | 10/2002 | Wachter | |
| 6,473,404 B1 * | 10/2002 | Kaplan et al. | 370/238 |
| 6,507,592 B1 | 1/2003 | Hurvig et al. | |
| 6,526,581 B1 * | 2/2003 | Edson | 725/74 |
| 6,563,858 B1 | 5/2003 | Fakatselis et al. | |
| 6,587,835 B1 | 7/2003 | Treyz et al. | |
| 6,590,588 B2 | 7/2003 | Lincke et al. | |
| 6,590,869 B1 * | 7/2003 | Beyda et al. | 370/248 |
| 6,647,015 B2 * | 11/2003 | Malkemes et al. | 370/401 |
| 6,670,970 B1 | 12/2003 | Bonura et al. | |
| 6,714,765 B1 | 3/2004 | Kimppa | |
| 6,728,517 B2 | 4/2004 | Sugar et al. | |
| 6,731,101 B2 | 5/2004 | Miyagawa et al. | |
| 6,748,199 B2 | 6/2004 | Nakano | |
| 6,768,981 B2 | 7/2004 | Patterson et al. | |
| 6,807,150 B1 * | 10/2004 | McNiff et al. | 370/230 |
| 6,819,944 B1 | 11/2004 | Sato | |
| 6,845,090 B1 | 1/2005 | Takabatake et al. | |
| 6,870,827 B1 * | 3/2005 | Voit et al. | 370/352 |
| 6,882,651 B1 * | 4/2005 | Balabanian | 370/353 |
| 6,954,615 B2 | 10/2005 | Sano | |
| 6,965,948 B1 * | 11/2005 | Eneborg et al. | 709/250 |
| 7,212,820 B2 * | 5/2007 | Persson et al. | 455/437 |
| 2001/0030950 A1 * | 10/2001 | Chen et al. | 370/329 |
| 2001/0034693 A1 | 10/2001 | Farhat et al. | |
| 2002/0065076 A1 * | 5/2002 | Monroe | 455/426 |
| 2004/0067766 A1 | 4/2004 | Yamamoto | |

FOREIGN PATENT DOCUMENTS

| | | |
|---|---|---|
| CN | 1249644 | 4/2000 |
| DE | 196 28 540 | 1/1998 |
| DE | 200 00 450 | 3/2000 |
| EP | 0 477 754 | 4/1992 |
| EP | 0 537 814 | 4/1993 |
| EP | 0 617 556 | 9/1994 |
| EP | 0 793 170 | 9/1997 |
| EP | 0 838 945 | 4/1998 |
| EP | 0 848 560 | 6/1998 |
| EP | 0 942 572 | 9/1999 |
| EP | 0 967 797 | 12/1999 |
| EP | 1 001 627 | 5/2000 |
| EP | 1 011 257 | 6/2000 |
| EP | 1 083 744 | 3/2001 |
| GB | 2 343 334 | 5/2000 |
| JP | 6 46270 | 2/1994 |
| JP | 06-141198 | 5/1994 |
| JP | 07-075030 | 3/1995 |
| JP | 07-336778 | 12/1995 |
| JP | 8 16907 | 1/1996 |
| JP | 8 79740 | 3/1996 |
| JP | 8 102719 | 4/1996 |
| JP | 8 181988 | 7/1996 |
| JP | 9 74496 | 3/1997 |
| JP | 09-74498 | 3/1997 |
| JP | 9 74556 | 3/1997 |
| JP | 09-298677 | 11/1997 |
| JP | 10 126771 | 5/1998 |
| JP | 10 257461 | 9/1998 |
| JP | 11 88419 | 3/1999 |
| JP | 11 136658 | 5/1999 |
| JP | 11 220665 | 8/1999 |
| JP | 11 298879 | 10/1999 |
| JP | 2000 183836 | 6/2000 |
| JP | 2000 197031 | 7/2000 |
| JP | 2000-251456 | 9/2000 |
| JP | 2001 86496 | 3/2001 |
| JP | 2001-160927 | 6/2001 |
| JP | 2001 313930 | 11/2001 |
| JP | 2002 41276 | 2/2002 |
| JP | 2002 57645 | 2/2002 |
| JP | 2002 84524 | 3/2002 |
| JP | 2002 116964 | 4/2002 |
| JP | 2002 185943 | 6/2002 |
| JP | 2002 191004 | 7/2002 |
| JP | 2002 271719 | 9/2002 |
| JP | 2002 305483 | 10/2002 |
| JP | 2002 312316 | 10/2002 |
| JP | 2002 328901 | 11/2002 |
| JP | 2002 344860 | 11/2002 |
| JP | 3092049 | 11/2002 |
| JP | 2002 354447 | 12/2002 |
| JP | 2003 18107 | 1/2003 |
| JP | 2003 37802 | 2/2003 |
| JP | 2003 46880 | 2/2003 |
| JP | 2003 108473 | 4/2003 |
| WO | WO 95/34168 | 12/1995 |
| WO | WO 98/59282 | 12/1998 |
| WO | WO 98 59282 | 12/1998 |
| WO | WO 99 34564 | 7/1999 |
| WO | WO 99 34599 | 7/1999 |
| WO | WO 00 14919 | 3/2000 |
| WO | WO 01 35551 | 5/2001 |
| WO | WO 01 35585 | 5/2001 |
| WO | WO 02/056486 | 7/2002 |

OTHER PUBLICATIONS

"Wireless Medium Access Control (MAC) and Physical (PHY) Specifications" IEEE Standard 802.11-1997, XX, XX, 1997, pp. 71-99, XP002927753.

Gang Wu et al: "WINMAC: a novel transmission protocol for infostations" Vehicular Technology Conference, 1999 IEEE 49th Houston, TX, USA May 16-20, 1999, Piscataway, NJ, USA, IEEE, US, May 16, 1999, pp. 1340-1344, XP010342188, ISBN: 0-7803-5565-2.

Truman T et al: "The Infopad Multimedia Terminal: a Portable Device for Wireless Information Access" IEEE Transactions on Computers, IEEE Inc. New York, US, vol. 47, No. 10, Oct. 1, 1998, pp. 1073-1087, XP000781992.

Patent Abstracts of Japan vol. 1998, No. 14, (Dec. 31, 1998) & JP 10 257401 A (Access:KK) Sep. 25, 1998.

Patent Abstracts of Japan, 2001-177478 dated Jun. 29, 2001.

* cited by examiner

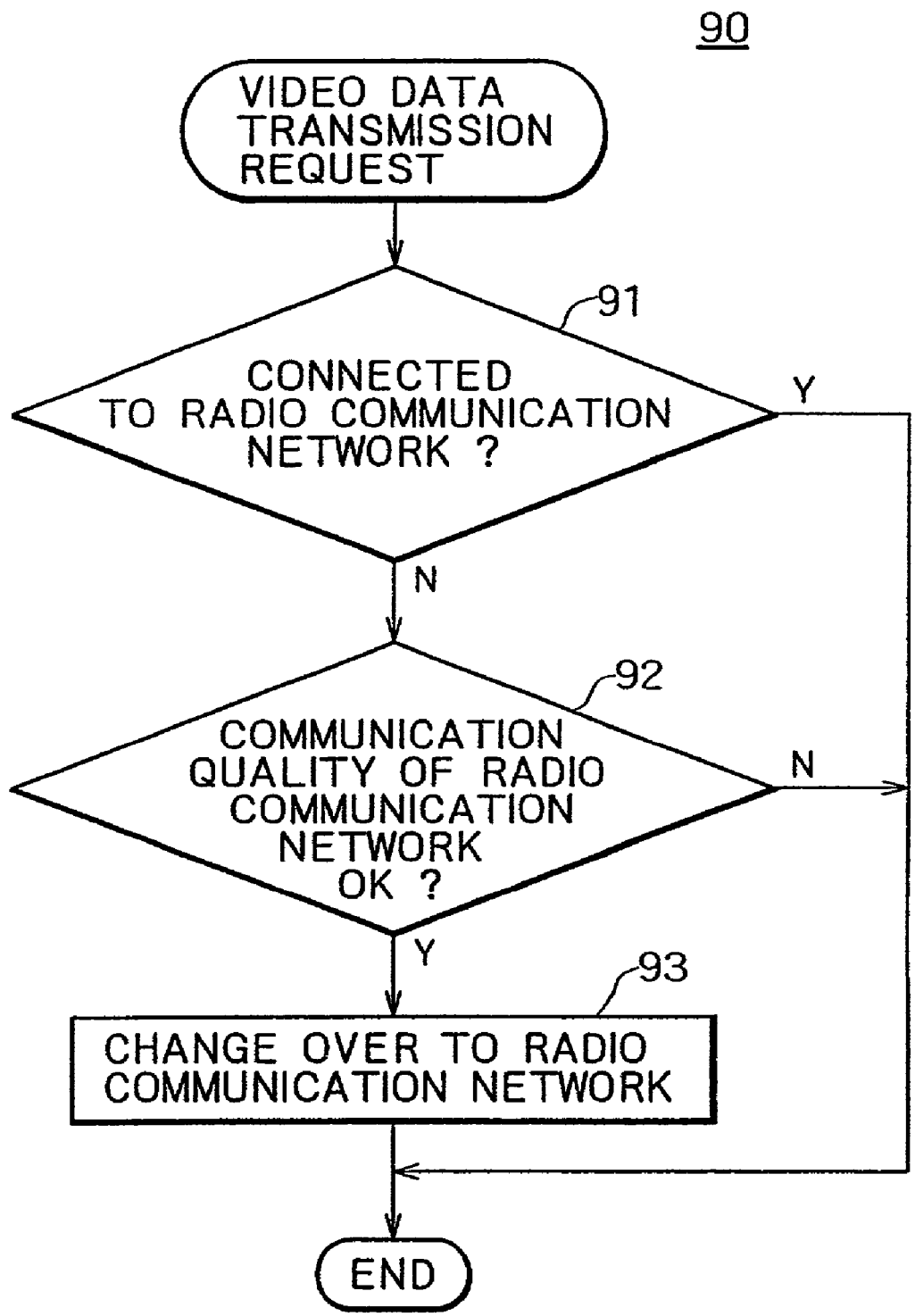

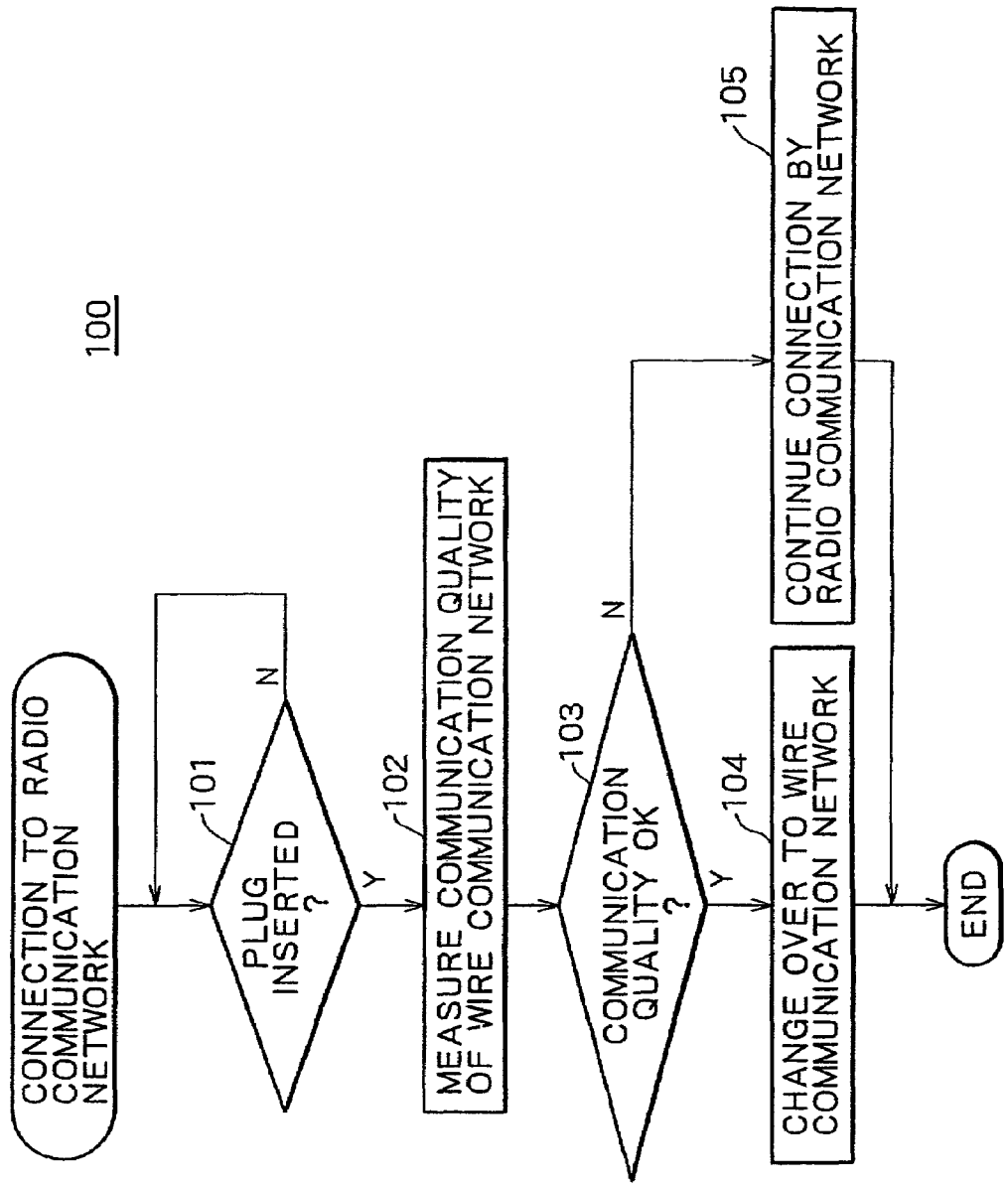

COMMUNICATION SYSTEM, APPARATUS AND METHODS EMPLOYING MULTIPLE COMMUNICATION NETWORKS

BACKGROUND OF THE INVENTION

The present invention relates to a communication system, method and apparatus for use in a local environment such as a house or building, and, more particularly, to a communication system employing multiple communication networks in an environment that may exhibit disturbances and interference.

With the growing popularity of personal computers, electronic devices, and the Internet, local area networks have been proposed to enable communication among computers and other electronic equipment within a common home. Home networks presently under consideration include wireline systems that use, for the data communication medium, either a telephone line; a power line; or a cable and interface complying with the IEEE 1394-1995 standard. Wireless networks have also been proposed. One such wireless system adopts the IEEE 802.11 standard, while another employs the so-called Bluetooth short-haul radio communication standard.

SUMMARY OF THE INVENTION

The present invention strives to alleviate various drawbacks and inconveniences of heretofore proposed home networks, while retaining their individual advantages.

A home-based communication system utilizing a power line, for instance, is advantageous in that it can be used in any room. A problem arises with the power line communication network, however, in that electrical disturbances may occur on the network when other electric apparatus are used on the power line, resulting in a degradation of communication quality. Conversely, a system using a telephone line network can maintain high communication quality rather easily. A drawback, however, to the telephone line network is the restriction on the user's mobility: the electronic device or computer communicates by plugging into a telephone jack, but in a typical home, telephone jacks are not provided in every room. On the other hand, a communication network using radio communication beneficially allows the user to communicate anywhere within the range of the radio signals. The radio network's shortcoming, however, resides in its vulnerability to extraneous radio wave noise and interference that may exist at any given time, possibly degrading the communication quality to an unacceptable level.

Considering the merits and demerits of each type of network, it is desirable to provide a local communication system that retains the individual advantages of the various networks while minimizing the above-noted drawbacks. This can be realized by a system which forms a plurality of communication networks between apparatus, and selectively uses one of the communication networks for communication at any given time. The network selection may take into account whether or not another electric apparatus is currently in use on a candidate wireline network (e.g., whether an electric appliance causing interference on a power line network is in use); the place where the communication apparatus is to be used; and the suitability of radio wave communication, e.g., whether electromagnetic disturbances are present. The network selection may be made by the user; however, it is preferable to relieve the user from the burden of this task. Further, the user cannot always discriminate accurately which one of the communication networks is currently appropriate, and thus an inadequate communication network might be selected.

The present invention provides, therefore, a communication method and apparatus by which favorable communication quality can always be maintained, but without imposing a considerable burden upon a user.

In one aspect of the present invention, there is provided a communication method for communicating between at least first and second communication apparatus, which includes the steps of: forming a plurality of communication networks between the first and second communication apparatus; measuring, upon starting communication between the first and second apparatus, communication quality of the communication networks using at least one of the communication apparatus; and selecting one of the communication networks to be used for the communication, based on a result of the measurement.

In another aspect of the invention, communication quality on an already selected communication network is monitored using at least one of the communication apparatus. If the monitored communication quality does not satisfy a criterion, the communication network to be used for further communication is switched over to another communication network that does satisfy the criterion.

Preferably, the first and second communication apparatus are a base apparatus and a terminal apparatus, respectively. The base apparatus is configured to receive a broadcast television signal and convert a selected television program (channel) of the television signal to a communication signal to be transmitted to the terminal apparatus for display of the television program. The terminal apparatus may be located, for example, in a different room than the base apparatus, or outdoors in the vicinity of the home, whereby the user is afforded a portable television display device that may be selectively used in a wireless (radio) or wireline mode. The base apparatus may be further equipped to transmit and receive data over the Internet, whereby the user of the portable terminal apparatus is able to surf the Web or send and receive e-mail through the base apparatus. The wireline mode of the terminal may be realized via plugging into a telephone jack forming part of a wireline communication network in the home. Priority may be given to the wireline connection, for example, and if communication quality degrades due to electrical interference or the like, communication can be automatically switched to the radio network, or vice versa.

With communication methods in accordance with the invention, favorable communication quality can always be maintained without imposing a considerable burden upon the user of the communication network system.

The above features and advantages according to the present invention will be apparent from the following detailed description of the illustrated embodiments when read in conjunction with the accompanying drawings.

BRIEF DESCRIPTION OF THE DRAWINGS

The following detailed description, given by way of example and not intended to limit the invention solely thereto, will best be appreciated in conjunction with the accompanying drawings, in which like reference numerals denote like elements and parts, wherein:

FIG. 8 is a flow chart illustrating an example of a network connection changeover processing routine that is application program dependent; and FIG. 9 is a flow chart illustrating an example of a network changeover processing routine that prioritizes a wireline communication network.

DETAILED DESCRIPTION OF PREFERRED EMBODIMENTS

Preferred embodiments of the present invention will now be described in the context of a communication system and method that selectively communicates audio/video signals over either a radio or wireline network in a house or building. It is understood, however, that the invention is not limited to this application and may be embodied in other forms. For instance, embodiments of the invention may employ a plurality of different wireline or wireless networks for selective communication. Further embodiments can include multiple terminal apparatus that communicate over one or more selected communication networks with a common base apparatus.

As used herein, the term "network" is intended to encompass any set of devices or subsystems connected by one or more links joining (directly or indirectly) a set of terminal nodes. In its simplest form, the term as used herein encompasses a wireline or wireless connection (as a single link) between only two devices.

Figure 1:
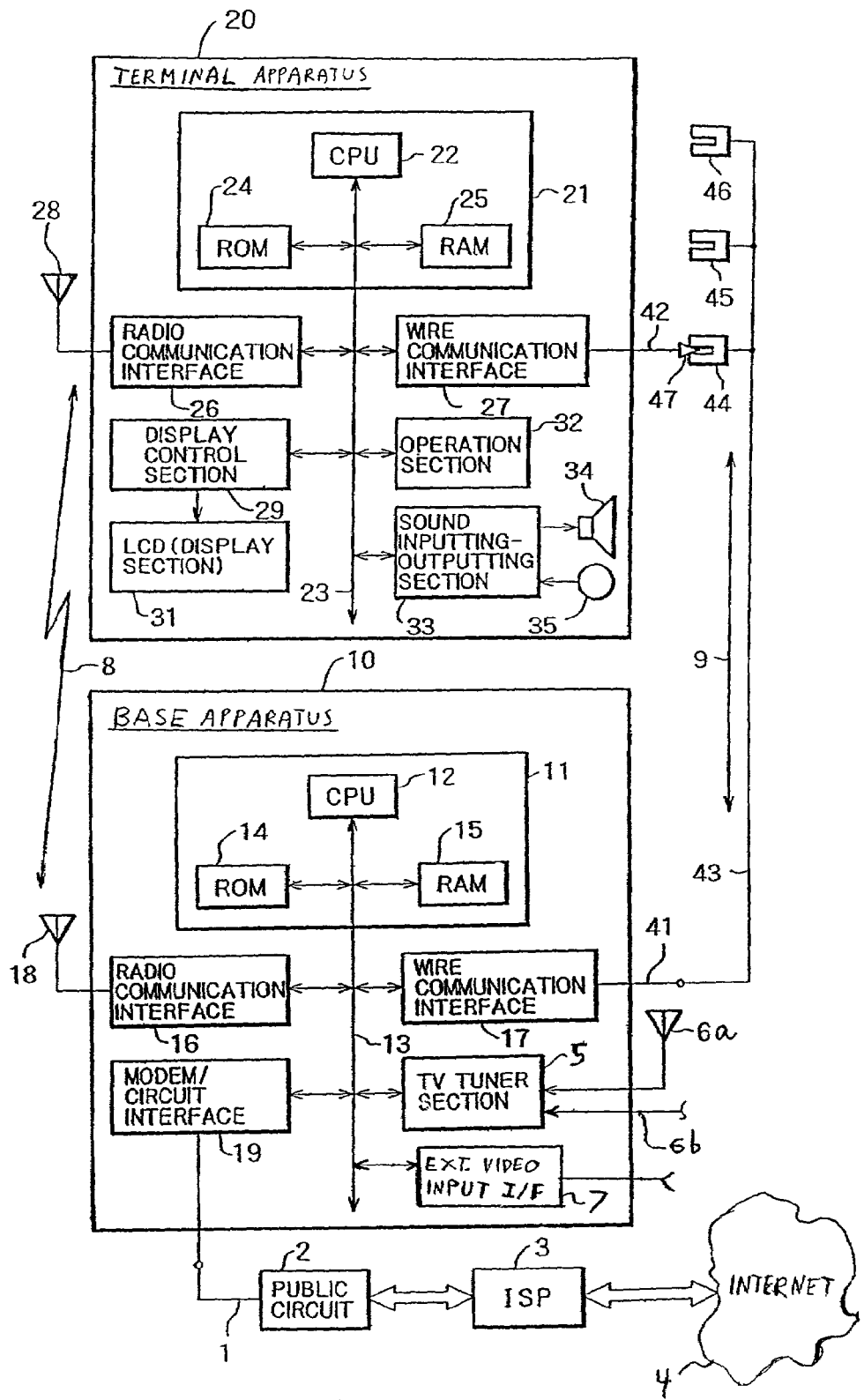
FIG. 1 is a block diagram showing an embodiment of a communication network system in accordance with the present invention.

Referring now to FIG. 1, there is shown an example of a communication network system that implements a communication method in accordance with the present invention. In the communication network system depicted, a radio communication network 8 and a wireline communication network 9 are individually formed between a base apparatus 10 and a terminal apparatus 20, and one of these networks 8 or 9 is selectively used for communication between the two apparatus.

Base apparatus 10 is disposed fixedly at a suitable place in a house or building and includes a control section 11 that provides commands to other electronics of the base apparatus. Control section 11 includes a central processing unit (CPU) 12, read only memory (ROM) 14 and random access memory (RAM) 15 interconnected by a bus 13. ROM 14 stores a program that includes a selection processing routine and a connection changeover processing routine (which are hereinafter described) to be executed by CPU 12. ROM 14 also stores fixed data such as test data and so forth (which is hereinafter described). RAM 15 functions as a working memory of CPU 12.

A radio communication interface 16 and a wire communication interface 17 are connected to bus 13. An antenna 18 is connected to radio communication interface 16, and an external connection line 41 is connected to wire communication interface 17. Radio communication interface 16 converts commands and data, which are to be transmitted from base apparatus 10 to terminal apparatus 20, into RF signals (typically in the microwave range) suitable for radio communication of preferably local range (e.g., within a house and its immediate vicinity) to terminal apparatus 20 through antenna 18. Radio communication interface 16 also processes incoming commands or data transmitted from terminal apparatus 20 and received by antenna 18, and outputs the processed result on bus 13. Wire communication interface 17 converts commands or data to be transmitted from base apparatus 10 to terminal apparatus 20, into signals suitable for wireline communication through external connection line 41. Further, wire communication interface 17 processes commands or data transmitted from the terminal apparatus 20 and obtained on the external connection line 41 and outputs the processed result on bus 13.

A telephone line 1 (or alternatively, a coaxial cable or fiber optic line) is connected to bus 13 through a modem/circuit interface 19 such that, as hereinafter described, terminal apparatus 20 can be connected to the Internet 4 via radio communication or wireline communication with base apparatus 10 through telephone line 1, a public circuit 2, and an Internet Service Provider (ISP) 3.

A television (TV) tuner section 5 is connected to bus 13 and to a TV antenna 6a and/or a cable 6b, the latter carrying a television broadcast from a cable television provider. TV tuner section 5 selects and demodulates a TV broadcast signal and then converts the signal into digital video data and digital audio data. Consequently, as hereinafter described, a user can experience a TV broadcast on terminal apparatus 20.

Preferably, the digital video and audio data generated by TV tuner 5 is in a compressed data format, which is later decompressed on the receiving side by terminal apparatus 20. A description of typical compression and decompression processing performed by base apparatus 10 and terminal apparatus 20, as well as other optional features of these apparatus, is set forth in co-pending U.S. patent application Ser. No. 09/880,301 filed Jun. 13, 2001, entitled TELEVISION RECEPTION SYSTEM, CHANNEL SELECTION APPARATUS AND DISPLAY APPARATUS, which is assigned to the assignee herein and incorporated herein by reference in its entirety.

Base apparatus 10 further includes an external audio/video input interface 7 for receiving video and audio signals from an external (or integrated) device such as a DVD player or a camcorder. In an external A/V input mode, the external A/V signals are transmitted from base apparatus 10 to terminal apparatus 20 on the selected communication network 8 or 9. This allows, for example, a DVD movie to be played at the location of base apparatus 10 and viewed at the different location of terminal apparatus 20.

Terminal apparatus 20 is portable, and is preferably small enough to be operated while being held by the user. It includes a control section 21 having a CPU 22, ROM 24 and RAM 25 interconnected by a bus 23. ROM 24 stores a program that includes a selection processing routine and a network connection changeover processing routine (which are hereinafter described) to be executed by CPU 22. ROM 24 also stores fixed data such as test data and so forth (which is hereinafter described). RAM 25 functions as a working memory of CPU 22.

A radio communication interface 26 and a wire communication interface 27 are connected to bus 23. An antenna 28 is connected to radio communication interface 26, and an external connection line 42 is connected to wire communication interface 27. Radio communication interface 26 converts commands and data, which are to be transmitted from terminal apparatus 20 to base apparatus 10, into RF signals (typically in the microwave range) suitable for radio communication to base apparatus 10 through antenna 28. Radio communication interface 26 also processes incoming commands or data transmitted from base apparatus 10 and received by antenna 28, and outputs the processed result on bus 23. Wire communication interface 27 converts commands or data to be transmitted from terminal apparatus 20 to base apparatus 10, into signals suitable for wireline communication through external connection line 42. Further, wire communication interface 27 processes commands or data transmitted from base apparatus 10, obtained on external connection line 42, and outputs the processed result on bus 23.

A liquid crystal display (LCD) 31 which forms a display section is connected to bus 23 through a display control section 29. Bus 23 is also connected to an operation section 32 and a sound inputting-outputting section 33, the latter being connected to a speaker 34 and microphone 35. Sound inputting-outputting section 33 converts digital audio data received on bus 23 into an analog audio signal for output to speaker 34. An analog audio signal from microphone 35 is converted by section 33 into digital audio data and output on bus 23.

Figure 2:
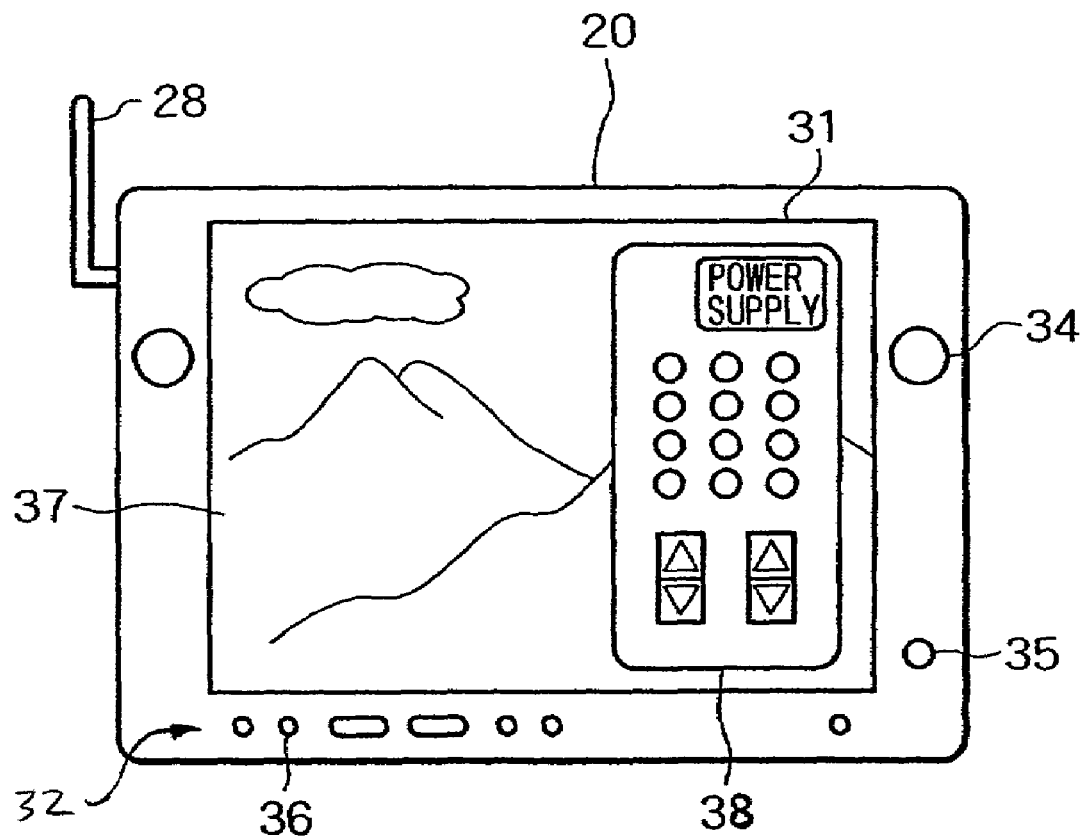
FIG. 2 illustrates an exemplary terminal apparatus configuration.

FIG. 2 illustrates an embodiment of a physical configuration for terminal 20. Operating section 32, for example, contains a key operation section 36 that includes several types of keys such as a power supply key mounted on terminal apparatus 20. A touch panel 37 is provided on the screen of LCD 31. A control panel 38 is displayed on LCD 31 when the user depresses a predetermined key of key operation section 36, or when the user touches the touch panel 37 within a predetermined region. (Control panel 38 may be displayed superimposed on other video currently displayed on LCD 31.) Several types of operations can be executed if the user depresses a key of the key operation section 36 or the user touches a key switch section of control panel 38.

Returning to FIG. 1, in the illustrated embodiment, the radio communication network 8 is formed between base apparatus 10 and terminal apparatus 20 from radio communication interface 16 and antenna 18 of base apparatus 10, and radio communication interface 26 and antenna 28 of the terminal apparatus 20. In other embodiments, base apparatus 10 may be adapted to wirelessly communicate video signals with additional terminal apparatus, e.g., on different frequencies or by using a suitable multiple access method. In this case, the radio communication network would be expanded.

External connection line 41, which is connected to wire communication interface 17 of base apparatus 10 is also connected to a wireline 43. Wireline 43 is laid on or through a wall and/or a floor in the house. A laid telephone line may be used as wireline 43. Jacks 44, 45 and 46 are connected to wireline 43 at locations where the user in the house would frequently use terminal apparatus 20. A removably insertable plug 47 is connected to external connecting line 42 connected to wire communication interface 27 of terminal apparatus 20. Thus, wireline communication network 9 is formed between base apparatus 10 and terminal apparatus 20 when the user connects plug 47 to jack 44, 45 or 46.

In the communication network system described above, if the user attempts to access the Internet 4 through terminal apparatus 20, a connection request to the ISP 3 based on operation at the operation section 32 is transmitted to base apparatus 10 through radio communication network 8 or wireline communication network 9, and connection to ISP 3 is performed by base apparatus 10. Then, for example, data transmitted from ISP 3 to telephone line 1 in response to an accessing request to a particular Internet page is output to bus 13 through the modem/circuit interface 19, and transmitted to terminal apparatus 20 through the selected communication network 8 or 9. Display data is produced from the transmitted data by control section 21, and the Internet page is displayed on LCD 31.

If the user attempts to receive a TV broadcast on terminal apparatus 20, a channel selection command based on an operation at operation section 32 is transmitted to base apparatus 10 through the selected communication network 8 or 9, and channel selection is executed by TV tuner section 5. Thereafter, video and audio data which are output from TV tuner section 5 to bus 13 based on the channel selection are transmitted to terminal apparatus 20 through communication network 8 or 9. Consequently, an image is displayed on LCD 31, and sound is output from speaker 34.

Terminal apparatus 20 can also be used as a telephone. In this case, a transmission voice signal from microphone 35 is output to bus 23 through the sound inputting-outputting section 33, and is transmitted to base apparatus 10 through communication network 8 or 9. The voice signal is then sent to telephone line 1 through modem/circuit interface 19. To receive voice signals from the other party of the telephone conversation, a reception audio signal obtained at telephone line 1 is output to bus 13 through modem/circuit interface 19, and is transmitted to terminal apparatus 20 through communication network 8 or 9, and then forwarded to speaker 34 through the sound inputting-outputting section 33.

Figure 3:
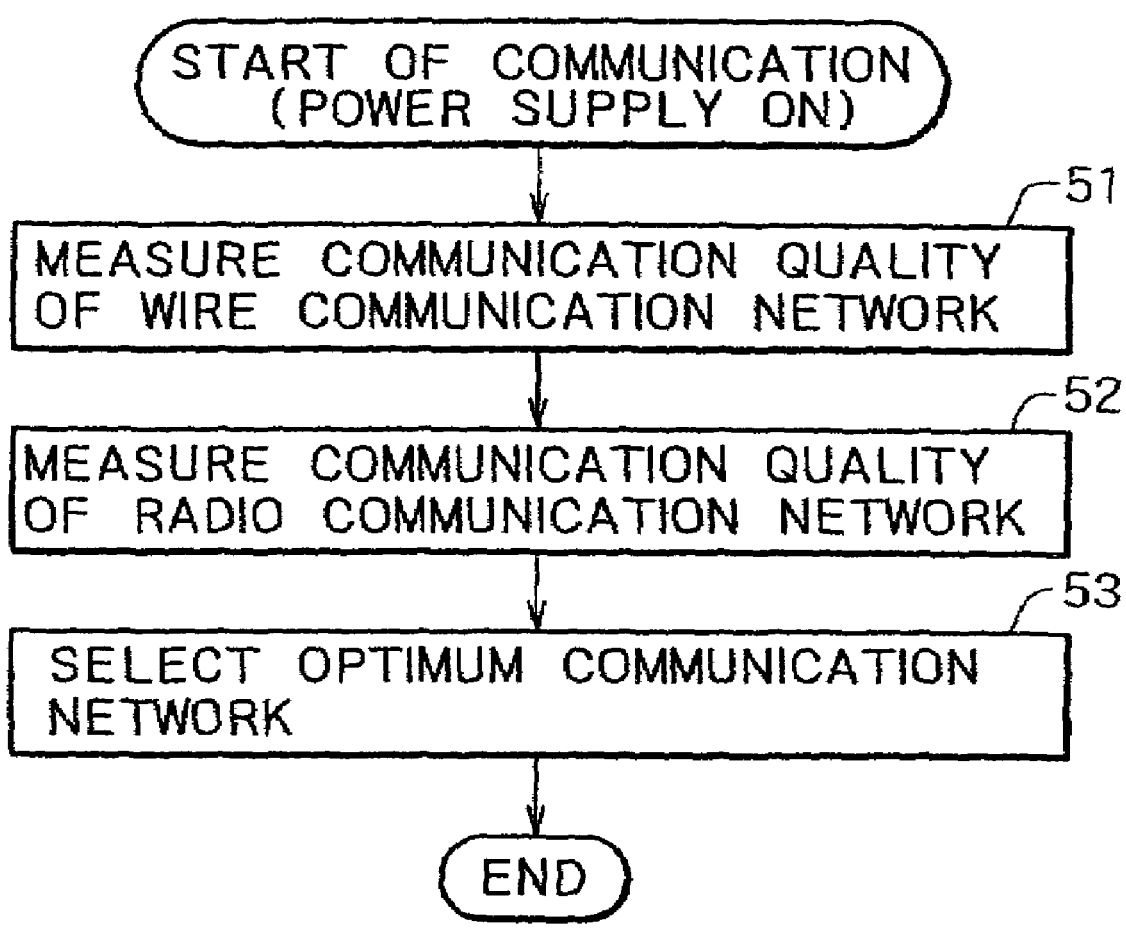
FIG. 3 is a flow chart illustrating an example of a selection processing routine.

Turning now to FIG. 3, a flow diagram of a selection processing routine 50 is shown, which is designed to select a suitable communication network 8 or 9 for communication between base apparatus 10 and terminal apparatus 20 in the system described above. In this embodiment, selection is made upon the start of communication between the two apparatus. Selection routine 50 runs in either control section 21 of terminal apparatus 20 or control section 11 of base apparatus 10. Of course, if plug 47 is not plugged into any of jacks 44, 45 or 46, the option of using wireline network 9 is not available, and the selection processing routine would be unnecessary, i.e., radio network 8 would automatically be selected. Thus the following discussion assumes that plug 47 is connected to wireline network 9.

As depicted in FIG. 3, at the start of a communication attempt, e.g., when the user first turns on the power supply to terminal apparatus 20, the communication quality of wire communication network 9 is first measured and the result is stored in memory (step 51). This is followed by a communication quality measurement of radio communication network 8, with the result thereof also being stored in memory (step 52). In step 53, the measurement results of steps 51 and 52 are compared, and the communication network that exhibits better quality is selected.

Figure 4:
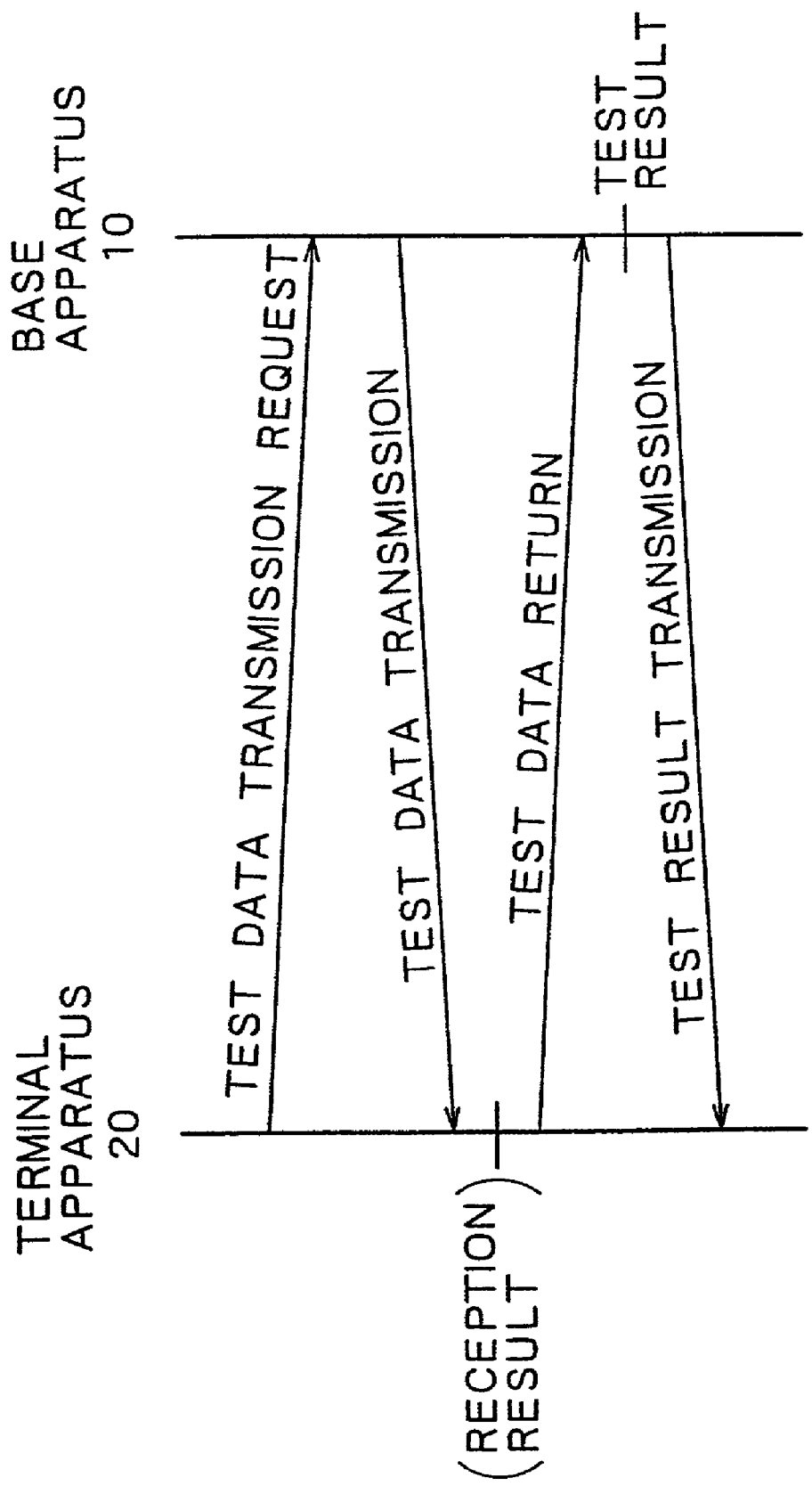
FIG. 4 is a flow diagram illustrating an example of a measurement method to measure communication quality.

FIG. 4 is a flow diagram illustrating an example of a communication quality measurement performed in steps 51 and/or 52 of processing routine 50. When the user switches on the power supply of terminal apparatus 20 to begin communication to either access the Internet, view a TV broadcast, etc., a request for transmission of test data is issued from terminal apparatus 20 to base apparatus 10. Such test data is then transmitted from base apparatus 10 to terminal apparatus 20 in accordance with the request. The test data is received by terminal apparatus 20 and then re-transmitted from terminal apparatus 20 back to base apparatus 10. In base apparatus 10, the received test data is compared with the original test data to calculate a test result. The test result may be based on the amount of bit errors between the original test data and the re-transmitted test data received by base apparatus 10. Alternatively, the test result may be based on a measurement of the signal to noise ratio of the re-transmitted data received by base apparatus 10. In any case, the test result determined by base apparatus 10 is transmitted to terminal apparatus 20 as a measure of the communication quality for the network (8 or 9) under consideration.

As an alternative, a test result can be calculated in terminal apparatus 20 (rather than in base apparatus 10) from a reception result of the test data transmitted from base apparatus 10. In this case, terminal apparatus 20 can be configured to compare the received test data to data pre-stored in memory corresponding thereto, and determine communication quality based on the quantity of errors between the received test data and the pre-stored data. The measurement of the communication quality would be completed when terminal apparatus 20 completes the test data measurement.

In order to perform communication from base apparatus 10 when an incoming telephone call is received at telephone line 1 or in a like case, communication symmetrical to that illustrated in FIG. 4, but in an opposite direction, is performed between base apparatus 10 and terminal apparatus 20. That is, base apparatus 10 issues a request for a transmission of test data to terminal apparatus 20; terminal apparatus 20 then transmits such test data to base apparatus 10; and so forth.

A notification of the selection result in step 53 is issued, if terminal apparatus 20 selects and determines the communication network, from terminal apparatus 20 to base apparatus 10 (and vice versa if base apparatus 10 makes the selection). Consequently, when the radio communication network 8 or 9 is selected, the ensuing communication is performed through selected communication network.

Generally, wireline communication network 9 can support communication in a more stable manner than radio communication network 8 if the transmission rate is equal. In the embodiment to be described below, the communication quality is measured in order beginning with the wireline network 9 (assuming that wireline network 9 has higher priority than radio network 8). If the communication quality satisfies a criterion set therefor, wireline network 9 may be selected as the communication network for performing communication without measuring the communication quality of radio network 8.

Figure 5:
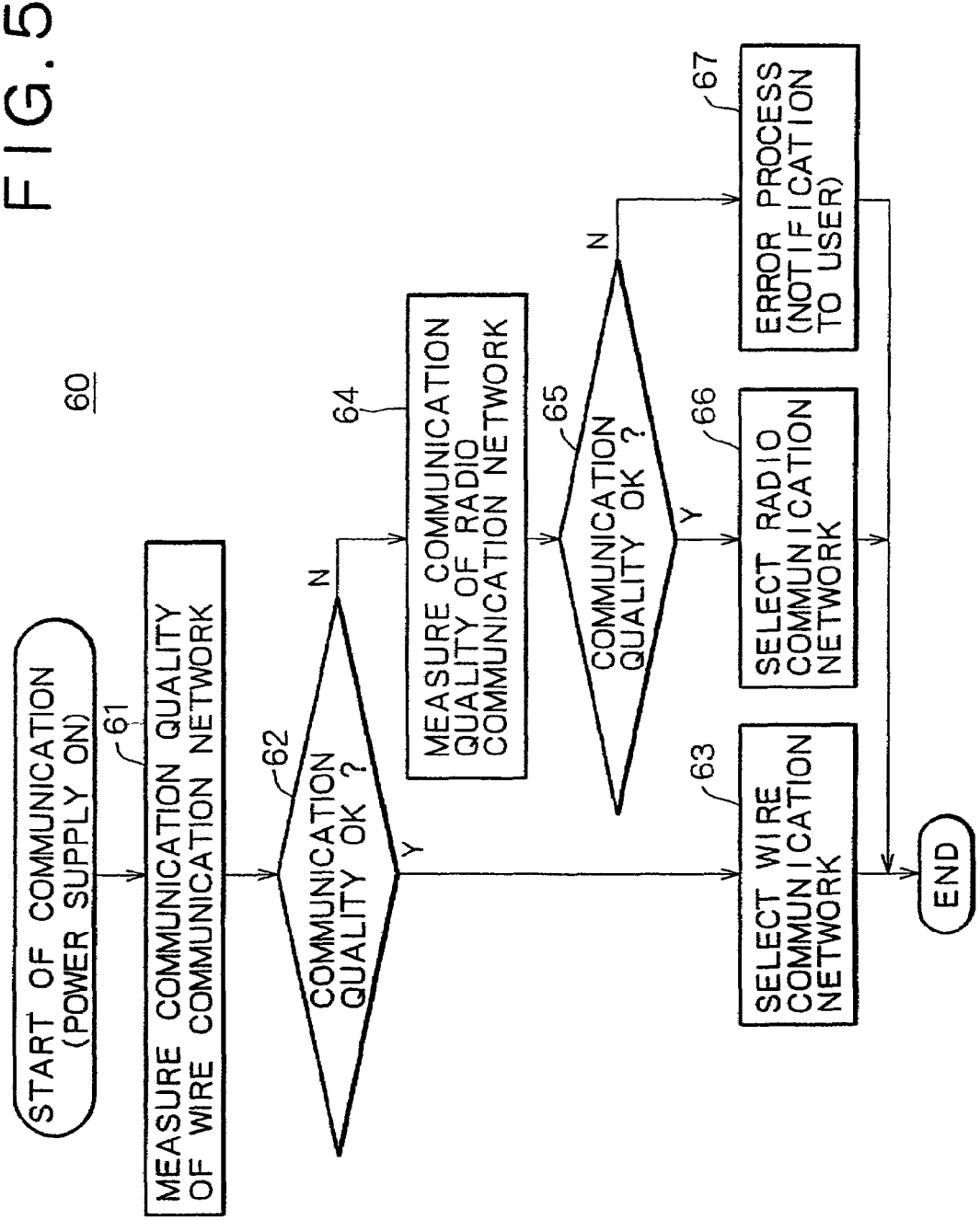
FIG. 5 is a flow chart of an illustrative priority based network selection processing routine.

FIG. 5 illustrates an embodiment of a priority based network selection processing routine in accordance with the invention, designated as 60. First, when the power supply of terminal apparatus 20 is initially turned on, the communication quality of wireline network 9 is measured (step 61) using the method as described hereinabove with reference to FIG. 4. Next, it is judged whether or not the communication quality of wireline network 9 satisfies a predetermined criterion (step 62). If the criterion is satisfied, wireline network 9 is selected (step 63).

If the communication quality of wireline network 9 does not satisfy the criterion, then the communication quality of radio network 8 is measured (step 64), and if it satisfies the quality criterion (step 65), radio network 8 is selected as the network for subsequent communication (step 66). If not, i.e., if neither network 8 nor 9 is determined to have satisfactory quality, an error process is executed (step 67). In particular, the user is notified of the inadequate communication quality condition of each network via a display of characters or the like on LCD 31 of terminal apparatus 20, or by means of an audible sound from speaker 34.

In the above processing routine 60, it was assumed that wireline network 9 was appropriately formed, i.e., that terminal apparatus 20 was electrically connected to wireline network 9 via insertion of plug 47 into jack 44, 45 or 46. If, on the other hand, the power supply of terminal apparatus 20 is turned on when terminal apparatus 20 is not plugged into wireline network 9, a detecting means (e.g., control section 21) within terminal apparatus 20 detects this condition. With this condition detected, processing routine 60 may be designed to proceed in the same manner as set forth in FIG. 5, with the obvious result of the communication quality on network 9 being detected as insufficient. In this instance, the routine proceeds to measure the quality of radio network 8 in steps 64 and 65, and if the quality of network 8 is insufficient, then instead of implementing the above-noted error process in step 67, the error process can be performed to urge the user to insert plug 47 into jack 44, 45 or 46 and to thereby notify the user of the presence of disturbing radio waves or the like causing the poor radio communication condition.

A communication network that is selected as being favorable in communication quality upon the start of communication, sometimes suffers from a drop in communication quality during subsequent communication. For example, consider the case where base apparatus 10 is configured to communicate with multiple terminal apparatuses 20 using a suitable multiple access method. In the case where a first terminal apparatus 20 is communicating with base apparatus 10 using a selected communication network, if a second terminal apparatus 20 begins communicating using the same communication network, then the throughput of that communication network drops and may cause a drop in the communication quality. In another scenario, radio communication network 8 is selected upon starting communication because no disturbing radio waves are present, but then disturbing radio waves develop during the communication and may cause a drop in the communication quality.

To address the above problems, in one aspect of the invention, during communication, the communication quality of a connected (first) communication network is monitored, and if a drop of the communication quality is detected, then the communication quality of a second communication network is measured. Then, if the communication quality of the second network thus measured satisfies a criterion therefor, communication is switched over to the second network for subsequent communication.

Figure 6:
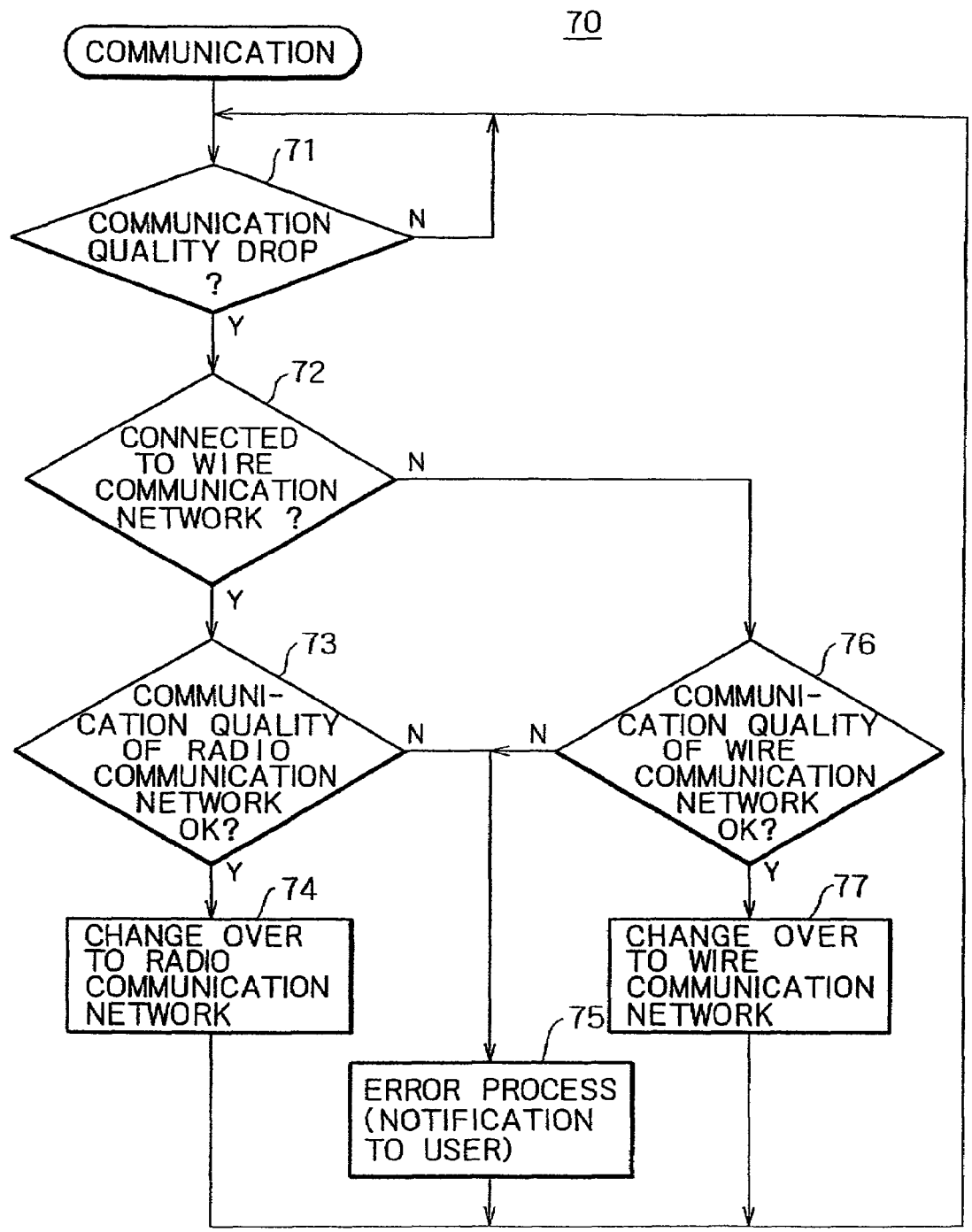
FIG. 6 is a flow chart of an illustrative network connection changeover processing routine.

FIG. 6 is a flow chart of an exemplary connection changeover processing routine, 70, to implement the above procedure. In this routine, it is first discriminated during communication whether or not the communication quality of the connected communication network exhibits a drop (step 71). For instance, if there is an increase of the frequency of data retransmission due to errors, or a significant drop in the signal to noise (S/N) ratio occurs, then control section 11 of base apparatus 10 or control section 21 of terminal apparatus 20 determines that the communication quality has dropped. Also, when a request for improvement in the communication quality is issued by an application program running on apparatus 10 or 20, control section 11 or 21 discriminates that the communication quality has dropped.

If a communication drop is detected in step 71, and if wireline communication network 9 is currently connected and used for communication (as determined in step 72) then the routine proceeds to step 73 in which the communication quality of radio network 8 is measured using, for example, the method of FIG. 4 described previously. If the communication quality of radio network 8 satisfies a predetermined criterion, then the process advances to step 74, in which the communication network to be used is changed over to radio network 8 to perform ensuing communication. If, however, the communication quality does not satisfy the criterion, then the flow advances to step 75, in which an error process similar to that in step 67 of routine 60 of FIG. 5 is executed.

On the contrary, if radio network 8 is connected (i.e., currently used for communication), as determined in step 72, then the processing advances from step 72 to step 76, in which a communication quality measurement of wireline network 9 is conducted as described previously with reference to FIG. 4. If the communication quality satisfies a predetermined criterion, then communication between apparatus 10 and 20 is switched over to wireline network 9. Otherwise, an error process is executed in step 75.

In another aspect of the invention, changes in the network environment are detected, and in response to such changes, the communication network to be used for subsequent communication is newly selected. One instance in which the network environment changes occurs when radio network 8 is currently being used for communication between apparatus 10 and 20 while plug 47 is not inserted into any jack, and then the user first inserts plug 47 into the jack 44, 45 or 46 during the course of the radio communication to form wireline communication network 9. The detection of such plug insertion can be performed by control section 21 of terminal apparatus 20, using a suitable mechanical or electrical detection method. Thus, the network change in this instance consists of the availability of another candidate network, i.e., wireline network 9, where that network 9 was not previously available.

Another type of network environment change occurs when terminal apparatus 20 and base apparatus 10 move relatively closer to each other while communication is occurring over wireline network 9. In this case, the network environment change amounts to an improvement in the communication quality of radio network 8. This change can be detected, for example, by control section 21 of terminal apparatus 20 periodically monitoring the field strength of a constant strength test signal transmitted by base apparatus 10. When the field strength increases significantly, this type of network change is detected. This monitoring can alternatively be done by control section 11 of base apparatus 10 monitoring a periodic test signal transmitted by terminal apparatus 20.

Figure 7:
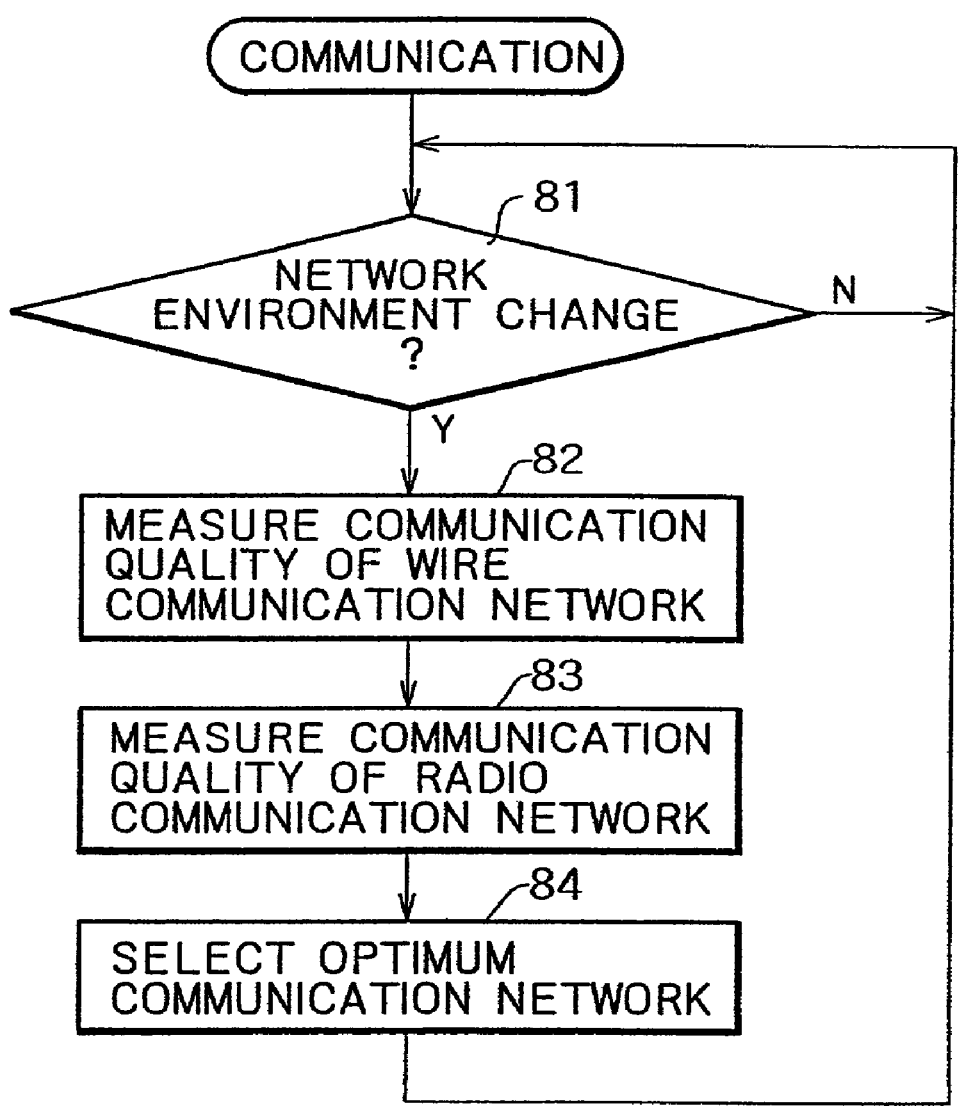
FIG. 7 is a flow chart illustrating an example of a network environment dependent selection processing routine.

FIG. 7 is a flow chart of an illustrative processing routine 80 that is responsive to a network environment change as just mentioned. In this example, it is assumed, for the sake of explication, that communication on radio network 8 is currently taking place, and that during such communication the user suddenly inserts plug 47 into jack 44, 45 or 46 to form wireline network 9 and thereby causes a network environment change. In step 81 of this routine, it is periodically checked during communication whether the network environment exhibits a change. If a change is detected, then the communication quality of wireline network 9 is measured in step 82 (as in the manner described above with reference to FIG. 3). Next, the communication quality of radio network 8 is measured in step 83, whereafter a result of the measurements in steps 82 and 83 are compared with each other in step 84 to select the communication network which exhibits superior communication quality.

An optimum communication network may vary depending upon an application program to be executed. For example, if the transmission throughput of the radio communication network 8 is 11 Mbps and the transmission throughput of the wireline communication network 9 is 1 Mbps, in order to transmit video data of a TV broadcast at a transmission rate higher than 1 Mbps from base apparatus 10 to terminal apparatus 20 in response to a request from terminal apparatus 20, the radio communication network 8 is more suitable than the wireline communication network 9. Thus, the communication network suitable for an application program to be executed is selected and used for communication of the application program.

FIG. 8 illustrates an example of a processing routine for effecting a connection changeover (network switch operation) which is application program dependent. In this example, in response to a video data transmission request from terminal apparatus 20, the communication network to be used for communication is changed over to radio network 8, which is suitable for transmission of higher speed video data. In step 91, following a video data transmission request from terminal apparatus 20, the routine discriminates whether or not radio network 8 is connected. This is accomplished by ascertaining whether base apparatus 10 is currently transmitting video data signals intended for terminal apparatus 20. If radio network 8 is connected, then the connection changeover process is terminated immediately. If not, then it is concluded that wireline network 9 is connected (i.e., that video data transmission is currently taking place over wireline network 9) and the routine advances to step 92.

In step 92, the method as described hereinabove with reference to FIG. 4 is performed to measure the communication quality of radio network 8, and it is determined whether or not communication quality satisfies the criterion. If the criterion is satisfied, the processing advances to step 93, in which the communication network to be used for communication is changed over to radio network 8 to perform communication for video data transmission. Conversely, if the criterion is not satisfied, it is determined that data should be transmitted through the currently connected wireline network 9, and the connection changeover process ends.

In the communication network system shown in FIG. 1, if the user performs an accessing operation to the Internet 4, a channel selection operation for a TV broadcast, or makes a telephone call using terminal apparatus 20 without inserting plug 47 into jack 44, 45 or 46, then wireline communication network 9 is not formed. In this scenario, in the selection processing routine 50 of FIG. 3 or the priority based selection processing routine 60 of FIG. 5, radio communication network 8 is automatically selected and used for communication. If, in this state, the user then inserts plug 47 into jack 44, 45 or 46, then since the communication quality of wireline communication network 9 is usually higher than that of radio communication network 8, preferably the communication network to be used for communication should be newly selected.

FIG. 9 illustrates an example of a processing routine, 100, to newly select a communication network under the condition just described. The routine first determines (step 101), while communication is occurring using radio network 8, whether or not plug 47 is inserted into jack 44, 45 or 46. If plug 47 is inserted, then the processing advances from step 101 to step 102, and a method as described hereinabove with reference to FIG. 4 is performed to measure the communication quality of wireline network 9. Next, it is determined in step 103 whether communication quality of wireline network 9 satisfies the criterion. If so, the processing advances to step 104, in which the communication network to be used is changed over to wireline network 9 to perform subsequent communication. However, if the communication quality does not satisfy the criterion, the routine advances to step 105, in which the connection of radio network 8 is continued.

It is understood that the present invention is not limited to the above embodiments, and that various changes and modifications can be made to those embodiments without departing from the scope of the invention. For instance, wireline communication network 9 has been described in the context of a telephone line, but is not limited to this embodiment. Instead, a power line used to support data communication; a television cable; a fiber optic line; or a communication network complying with the IEEE 1394 standards can be used for wireline communication network 9.

Further, with radio communication network 8 and wireline communication network 9 formed as in the communication network system described above, the priority order may be determined conversely to that of the example described hereinabove with reference to FIG. 5, such that radio network 8 has higher priority than wireline network 9, and the communication quality is measured in an order beginning with radio network 8.

Further, while the communication network system described above includes radio communication network 8 and wireline communication network 9, the present invention can also be applied to a different type of communication network system that includes two or more wireline communication networks, two or more radio communication networks such as a communication network complying with the IEEE 802.11 standards and a communication network complying with the Bluetooth standard, or three or more wire and/or radio communication networks to be selectively used for communication between a base apparatus and a terminal apparatus.

Moreover, the base apparatus and terminal apparatus are not limited to the specific embodiments described hereinabove with reference to FIGS. 1 and 2. For example, the base apparatus may be of the type which is connected to an external apparatus by an ISDN (Integrated Services Digital Network), a cable modem, an xDSL (x Digital Subscriber Line) or the like. Further, the base apparatus need not necessarily be connected to the Internet.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A communication method for communicating between a first communication apparatus and a second communication apparatus, comprising:
    forming a plurality of communication networks between the first communication apparatus and the second communication apparatus;
    measuring, upon starting communication between said first apparatus and said second apparatus, communication quality of said communication networks using at least one of said communication apparatus; and
    selecting one of said communication networks to be used for the communication, based on:
        the measured communication quality; and
        an ability to execute an application program for transmission of high speed video data,
    wherein said communication quality is measured by the second communication apparatus by:
    sending test data to the first communication apparatus in response to a request;
    receiving re-sent test data from the first communication apparatus;
    comparing the sent test data to the received re-sent test data; and
    determining the communication quality as a function of errors detected in comparison;
    or
    wherein said communication quality is measured by the first communication apparatus by:
    sending a request for transmission of test data;
    receiving test data from the second communication apparatus in response to the request;
    comparing received test data to stored test data; and
    determining the communication quality as a function of errors detected in comparison.

2. The communication method according to claim 1, further comprising:
    setting a priority order between said communication networks;
    said measuring comprises measuring the communication quality in order beginning with the communication network having relatively high priority; and
    if the communication quality of a particular one of said communication networks satisfies a criterion set in advance therefor, selecting that communication network as the communication network to be used for communication without measuring the communication quality of any other of said communication networks having lower priority.

3. The communication method according to claim 2, wherein:
    said communication networks are operable to transmit audio/video data.

4. The communication method according to claim 1, wherein each of said communication networks are local communication networks operable within a residential building.

5. The communication method according to claim 4, wherein:
    the first communication apparatus is a base apparatus that receives at least a television broadcast signal containing multiple television programs on different respective television channels;
    the second communication apparatus is a terminal apparatus having a display;
    the terminal apparatus including an operating section that selects a television channel within said television broadcast signal responsive to a user channel selection;
    the terminal apparatus transmitting a channel command corresponding to the selected channel to the base apparatus;
    the base apparatus receiving the transmitted channel command, tuning to the selected channel to receive a television program on the selected channel and converting the television program of the broadcast signal into a communication signal;
    the base apparatus locally transmitting the communication signal on the selected communication network to the terminal apparatus; and
    the terminal apparatus receiving the communication signal and converting it to a display signal for display on the display.

6. The communication method according to claim 5, further comprising:
    the base apparatus selectively receiving data signals from the Internet;
    the base apparatus converting the received data signals to a data communication signal and transmitting the data communication signal on the selected communication network to the terminal apparatus;
    the terminal apparatus receiving the data communication signal and converting it to a video display signal for display on the display.

7. The communication method according to claim 5, wherein,
    the base apparatus further receiving video signals via an external video input;
    the base apparatus converting the received video signals to a video communication signal and transmitting the video communication signal on the selected communication network to the terminal apparatus;
the terminal apparatus receiving the video communication signal and converting it to a video display signal for display on the display.

8. The communication method according to claim 1, wherein forming a plurality of communication networks between the first communication apparatus and the second communication apparatus is performed by:
providing each of said first communication apparatus and said second communication apparatus with a radio communication interface to form a radio communication network; and
providing each of said first communication apparatus and said second communication apparatus with a wireline interface;
whereby a wireline communication network is formed when said first communication apparatus and said second communication apparatus are connected to a wireline therebetween.

9. The communication method according to claim 8, wherein said wireline is selected from the group consisting of a telephone line, a coaxial cable, an IEEE 1394-1995 cable, a fiber optic cable, and a power line.

10. A communication method for communicating between a first communication apparatus and a second communication apparatus, comprising:
forming a plurality of communication networks between the first communication apparatus and the second communication apparatus;
selectively using a first one of said communication networks for communication between said first communication apparatus and said second communication apparatus;
monitoring, during communication through the first communication network, communication quality of the first communication network using at least one of said communication apparatus; and
changing over, if the monitored communication quality does not satisfy a criterion, the communication network to be used for further communication to a second one of said communication networks whose communication quality satisfies the criterion,
selecting as the second one of said communication networks, a communication network as a function of:
an ability to execute an application program for transmission of high speed data for communication of the application program, and
the measured communication quality,
wherein said communication quality is measured by the second communication apparatus by:
sending test data to the first communication apparatus in response to a request;
receiving re-sent test data from the first communication apparatus;
comparing the sent test data to the received re-sent test data; and
determining the communication quality as a function of errors detected in comparison;
or
wherein said communication quality is measured by the first communication apparatus by:
sending a request for transmission of test data;
receiving test data from the second communication apparatus in response to the request;
comparing received test data to stored test data; and
determining the communication quality as a function of errors detected in comparison.

11. A communication method for communicating between a first communication apparatus and a second communication apparatus, comprising:
forming a plurality of communication networks between the first communication apparatus and the second communication apparatus;
selectively using a first one of said communication networks for communication between said first communication apparatus and said second communication apparatus;
monitoring, during communication through one of said communication networks, a network environment using at least one of said communication apparatus; and
measuring, if the network environment changes, the communication quality of said first and second communication networks to select one of said communication networks which is to be used for communication,
selecting a communication network as a function of:
an ability to execute an application program for transmission of high speed data for communication of the application program; and
the measured communication quality,
wherein said communication quality is measured by the second communication apparatus by:
sending test data to the first communication apparatus in response to a request;
receiving re-sent test data from the first communication apparatus;
comparing the sent test data to the received re-sent test data; and
determining the communication quality as a function of errors detected in comparison;
or
wherein said communication quality is measured by the first communication apparatus by:
sending a request for transmission of test data;
receiving test data from the second communication apparatus in response to the request;
comparing received test data to stored test data; and
determining the communication quality as a function of errors detected in comparison.

12. A communication method for communicating between a first communication apparatus and a second communication apparatus, comprising:
forming a radio communication network between the first communication apparatus and the second communication apparatus;
communicating between the first communication apparatus and said second communication apparatus over said radio communication network;
forming a wireline communication network between the first communication apparatus and the second communication apparatus while said communicating is occurring over said radio communication network;
wherein said wireline communication network is formed due to a sudden electrical connection over a wireline between first communication apparatus and said second communication apparatus,
measuring communication quality of said wireline communication network and said radio communication network, using one of said first communication apparatus and said second communication apparatus; and
changing over, when the measured communication quality satisfies a criterion, the communication network to the wireline communication network to perform further communication between first communication apparatus and said second communication apparatus,
selecting a wireline communication network as a function of:
an ability to execute an application program for transmission of high speed data for communication of the application program; and
the measured communication quality,
wherein said communication quality is measured by the second communication apparatus by:
sending test data to the first communication apparatus in response to a request;
receiving re-sent test data from the first communication apparatus;
comparing the sent test data to the received re-sent test data; and
determining the communication quality as a function of errors detected in comparison;
or
wherein said communication quality is measured by the first communication apparatus by:
sending a request for transmission of test data;
receiving test data from the second communication apparatus in response to the request;
comparing received test data to stored test data; and
determining the communication quality as a function of errors detected in comparison.

13. A first communication apparatus for a communication network system wherein a plurality of communication networks are formed between a plurality of different communication apparatus and one of said communication networks is selectively used for communication between said communication apparatus, comprising:
a plurality of communication interfaces for forming said communication networks; and
a communication network selection section for:
measuring communication quality of said communication networks upon starting communication; and
selecting a communication network as a function of:
an ability to execute an application program for transmission of high speed data for communication of the application program; and
the measured communication quality,
wherein said communication networks include at least one wireline communication network and at least one radio communication network,
wherein the first communication apparatus and a second communication apparatus simultaneously participate in both one of the wireline communication networks and one of the radio communication networks,
wherein said communication quality is measured by the second communication apparatus by:
sending test data to the first communication apparatus in response to a request;
receiving re-sent test data from the first communication apparatus;
comparing the sent test data to the received re-sent test data; and
determining the communication quality as a function of errors detected in comparison;
or
wherein said communication quality is measured by the first communication apparatus by:
sending a request for transmission of test data;
receiving test data from the second communication apparatus in response to the request;
comparing received test data to stored test data; and
determining the communication quality as a function of errors detected in comparison.

14. The communication apparatus according to claim 13, wherein said first communication apparatus communicates with another communication apparatus to receive data and displays an image based on the received data.

15. The communication apparatus according to claim 14, wherein said first communication apparatus communicates with another communication apparatus to transmit data.

16. A first communication apparatus for a communication network system wherein a plurality of communication networks are formed between a plurality of different communication apparatus and one of said communication networks is selectively used for communication between said communication apparatus, comprising:
a plurality of communication interfaces for forming said communication networks; and
a communication network changeover section for monitoring, during communication through a particular one of said communication networks, communication quality of the particular communication network;
said communication network changeover section:
changing over, if the supervised communication quality does not satisfy a criterion, the communication network to be used for communication to another one of said communication networks whose communication quality satisfies the criterion; and for
selecting the communication network as a function of:
an ability to execute an application program for transmission of high speed data for communication of the application program; and
the communication quality,
wherein said communication networks include at least one wireline communication network and at least one radio communication network,
wherein the first communication apparatus and a second communication apparatus simultaneously participate in both one of the wireline communication networks and one of the radio communication networks,
and
wherein said communication quality is measured by the second communication apparatus by:
sending test data to the first communication apparatus in response to a request;
receiving re-sent test data from the first communication apparatus;
comparing the sent test data to the received re-sent test data; and
determining the communication quality as a function of errors detected in comparison;
or
wherein said communication quality is measured by the first communication apparatus by:
sending a request for transmission of test data;
receiving test data from the second communication apparatus in response to the request;
comparing received test data to stored test data; and
determining the communication quality as a function of errors detected in comparison.

17. A communication apparatus according to claim 16, wherein said first communication apparatus communicates with another communication apparatus to receive data and displays an image based on the received data.

18. A communication apparatus according to claim 16, wherein said first communication apparatus communicates with another communication apparatus to transmit data.

19. A communication system configured for residential use, comprising:
- a base apparatus, said base apparatus comprising:
  - a television tuner section for receiving a television broadcast signal and selecting a broadcast program therefrom on a television channel in accordance with a user selection of a specific channel of the television broadcast signal;
  - a radio communication interface to convert said selected broadcast program into radio signals for local radio transmission when a radio communication network is selected for communication;
  - at least one wireline communication interface to convert said selected broadcast program to local wireline communication signals for transmission on a local wireline communication network when the local wireline communication network is selected for communication; and
  - a control section for controlling transmission of the selected broadcast program on either said radio communication network or said wireline communication network;
- at least one terminal apparatus comprising:
- a radio communication interface for receiving said radio signals;
- a wire communication interface for receiving said wireline communication signals;
- a display section for displaying images of said broadcast program of said received radio signals or said received wireline communication signals;
- at least one of said base apparatus and said terminal apparatus including a section for:
- measuring communication quality of the radio and wireline communication networks when the terminal apparatus is first turned on, and
- selecting between said radio and wireline communication networks based on:
- the measurement as the communication network to be used for communication of the selected broadcast program; and
- as a function of an ability to execute an application program for transmission of high speed data,
- wherein the base apparatus and at least one of the terminal apparatus participate simultaneously in both the radio communication network and the wireline communication network, and
- wherein said communication quality is measured by the terminal apparatus by:
- sending test data to the base apparatus in response to a request;
- receiving re-sent test data from the base apparatus;
- comparing the sent test data to the received re-sent test data; and
- determining the communication quality as a function of errors detected in comparison;
- or
- wherein said communication quality is measured by the base apparatus by:
- sending a request for transmission of test data;
- receiving test data from the terminal apparatus in response to the request;
- comparing received test data to stored test data; and
- determining the communication quality as a function of errors detected in comparison.

20. The communication system of claim 19 wherein said local wireline communication network is a wireline network within a single building, and said radio communication network is a network configured for communication only within the building and its immediate vicinity.

21. The communication system according to claim 19, wherein said wireline is selected from the group consisting of a telephone line, a coaxial cable, an IEEE 1394-1995 cable, and a power line.

22. A communication system configured for residential use, comprising:
- a base apparatus, said base apparatus comprising:
  - a television tuner section for receiving a television broadcast signal and selecting a broadcast program therefrom on a television channel in accordance with a user selection of a specific channel of the television broadcast signal;
  - a radio communication interface to convert said selected broadcast program into radio signals for local radio transmission when a radio communication network is selected for communication;
  - at least one wireline communication interface to convert said selected broadcast program to local wireline communication signals for transmission on a local wireline communication network when the local wireline communication network is selected for communication; and
  - a control section for controlling transmission of the selected broadcast program on either said radio communication network or said wireline communication network;
- at least one terminal apparatus comprising:
- a radio communication interface for receiving said radio signals;
- a wire communication interface for receiving said wireline communication signals;
- a display section for displaying images of said broadcast program of said received radio signals or said received wireline communication signals;
- at least one of said base apparatus and said terminal apparatus including:
- a monitoring section for monitoring communication quality of the selected communication network as a function of:
- an ability to execute an application program for transmission of high speed data, and if the communication quality is below a predetermined threshold; and,
- a measurement of communication quality of the other communication network;
- wherein if the communication quality of the other communication network is above said predetermined threshold, communication is changed over to that communication network, and
- wherein the base apparatus and at least one of the terminal apparatus participate simultaneously in both the radio communication network and the wireline communication network, and
- wherein said communication quality is measured by the terminal apparatus by:
- sending test data to the base apparatus in response to a request;
- receiving re-sent test data from the base apparatus;
- comparing the sent test data to the received re-sent test data; and
- determining the communication quality as a function of errors detected in comparison;
- or
- wherein said communication quality is measured by the base apparatus by:
- sending a request for transmission of test data;

receiving test data from the terminal apparatus in response to the request;

comparing received test data to stored test data; and determining the communication quality as a function of errors detected in comparison.

23. The communication system of claim 22 wherein said local wireline communication network is a wireline network within a single building, and said radio communication network is a network configured for communication only within the building and its immediate vicinity.

24. The communication system according to claim 22, wherein said wireline is selected from the group consisting of a telephone line, a coaxial cable, an IEEE 1394-1995 cable, and a power line.

* * * * *